Aug. 18, 1936. H. A. CURTIS 2,051,029
MANUFACTURE OF AMMONIUM PHOSPHATES
Filed May 21, 1934
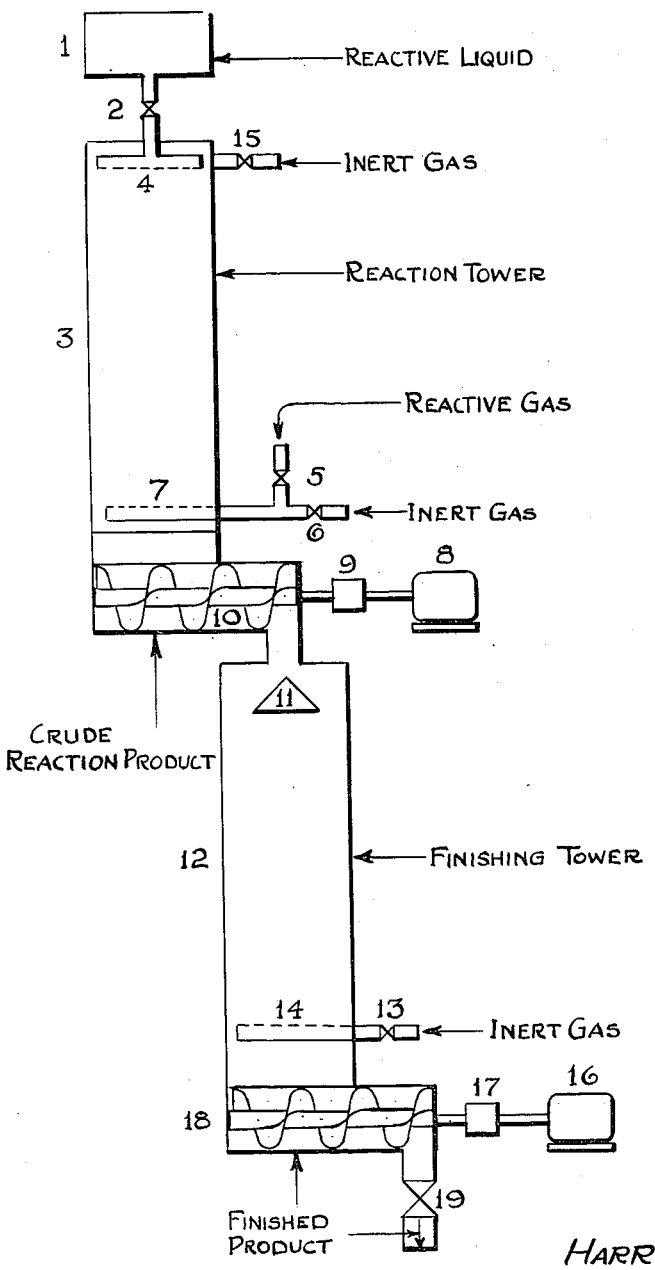
*Harry A. Curtis*
INVENTOR
BY *Arthur L. Davis*
ATTORNEY Patented Aug. 18, 1936

2,051,029

UNITED STATES PATENT OFFICE 2,051,029

MANUFACTURE OF AMMONIUM PHOSPHATES

Harry A. Curtis, Knoxville, Tenn., assignor to Tennessee Valley Authority, Wilson Dam, Ala., a corporation of the United States Application May 21, 1934, Serial No. 726,756

4 Claims. (Cl. 23—107)

(Granted under the act of March 3, 1883, as amended April 30, 1928; 370 O. G. 757)

This invention relates to an improved process of and apparatus for causing a gas to react with a liquid under conditions such that the proper temperature for reaction is controlled to obtain a product of uniform quality, particularly in connection with the manufacture of ammonium salts from ammonia and phosphoric acid.

This application is made under the act of April 30, 1928, and the invention herein described, if patented, may be manufactured and used by or for the Government for governmental purposes without the payment to me of any royalty thereon.

One of the objects of this invention is the control of the conditions of reaction so that the resulting product may be the one selected from the several compounds capable of being made from a given set of reactants. Another object of this invention is the providing for a means of contact for reactants so that substantially complete union is effected, especially in the cases where one or both of the reactants are used in concentrated form. Other objects include the means for removal of a portion or all of the heat of reaction and the means for the production of a dry granular of high quality.

Three ammonium phosphates may be made by combining ammonia and phosphoric acid, namely, mono-ammonium phosphate, di-ammonium phosphate and tri-ammonium phosphate. Ammonia and sulfuric acid will yield two ammonium sulfates, the mono-ammonium sulfate known as ammonium bisulfate and the di-ammonium sulfate which is commonly called ammonium sulfate.

I have found that, by spraying a reactive liquid into the top of a tall reaction tower in which the temperature of the reaction zone is controlled and by distributing a mixture of reactive gas and a second gas, which is inert chemically under the conditions of operation, so that the gas mixture will pass upward from near the bottom of the reaction tower, a solid product of reaction falls to the bottom of the tower. The flow of the reactive liquid and the flow of the reactive gas are so regulated that the deliveries to the reaction tower are in substantially stoichiometric proportions. The proportions of reactive gas and inert gas are so adjusted that the partial pressure of the reactive gas is greater than the vapor pressure of the reactive gas for the compound selected to be formed at the temperature of the reaction zone and less than the vapor pressure of the reactive gas for the next higher vapor pressure compound of the series for the same temperature of the reaction zone, where such a compound is known to exist. The vapor pressures of ammonia for one such series of compounds, the ammonium orthophosphates, included in the data presented in the paper of Ross, Merz and Jacob on the Preparation and Properties of Ammonium Phosphates, published in Industrial and Engineering Chemistry 21, 286 (1929) March, are as follows:

| Compound | Ammonia vapor pressure, mm. Hg. | |
| --- | --- | --- |
|  | 100° C. | 125° C. |
| Mono-ammonium phosphate | 0.0 | 0.05 |
| Di-ammonium phosphate | 5.0 | 30 |
| Tri-ammonium phosphate | 643 | 1,170 |

I have also found that, in some instances, it is desirable to remove any excess of unreacted gas held by the reaction product by contacting the latter with a gas, which is inert chemically under the conditions of operation, in a finishing tower and finally to remove the reactive gas from the inert gas by admitting the mixture to the bottom of the reaction tower.

A diagrammatic vertical section of one form of apparatus for the embodiment of my process is shown in the accompanying drawing. The reactive liquid reservoir 1, connects by valved line 2, through the top of the reaction tower 3, to a distributor 4. The valved reactive gas line 5, joins the valved inert gas line 6, and passes through the side of tower 3, near the bottom to distributor 7. The motor 8, through the speed reducer 9, drives the screw conveyor 10, which charges from the bottom of tower 3, and discharges on the distributor 11, into the flinishing tower 12. The second valved inert gas line 13, passes through the side of tower 12, near the bottom and joins the distributor 14. The inert gas exits through valved line 15. The motor 16, through the speed reducer 17, drives the screw conveyor 18, which charges from the bottom of tower 12, and discharges into the valved outlet 19.

One example of the operation of my process is given for the manufacture of mono-ammonium phosphate: phosphoric acid, containing 90% $H_3PO_4$, is admitted continuously and uniformly to the top of a reaction tower at a rate of flow of 98 parts by weight in a given time and 17 parts by weight of gaseous ammonia admixed with air in volume ratios of 25 to 735 are distributed from near the bottom of the reaction tower so that the gaseous mixture passes up the tower countercurrent to the falling acid. The reaction zone in the reaction tower is maintained at 125° C. The reaction product which falls to the bottom of the tower is withdrawn, distributed into the top of the finishing tower and contacted with air distributed from near the bottom of the finishing tower so that it passes countercurrent to the falling reaction product. The rate of admission of the air to the bottom of the finishing tower is adjusted to the minimum required for the substantially complete removal of excess ammonia held by the reaction product.

Another example of the functioning of my process is shown for the manufacture of di-ammonium phosphate: phosphoric acid, containing 60% $H_3PO_4$, is admitted at a rate of flow of 98 parts by weight and 34 parts by weight of ammonia admixed with air in volume ratios of 1 to 9 are contacted at the same reaction zone temperature following the same procedure as described in the foregoing example.

An additional example is given for the production of ammonium sulfate: sulfuric acid, containing 60% $H_2SO_4$, at a rate of flow of 98 parts by weight in a given time and 34 parts by weight of gaseous ammonia admixed with air in volume ratios of 1 to 9 are contacted at 125° C. following the same procedure as described in the example given for the manufacture of mono-ammonium phosphate.

The three examples presented are illustrative of means for the manufacture of numerous materials, by the use of the described process and apparatus, by combining a reactive gas and a reactive liquid of high concentration to form a solid reaction product of good quality.

The selection of the temperature for the reaction zone and its uniform maintenance are matters of first importance. The temperature selected may be one in a considerable range of values for satisfactory operation and for this reason some indication of its influence upon other factors is included. An increase in temperature of the reaction zone will permit the use of a higher partial pressure of reactive gas in the inert gas mixture and at the same time will require a decrease in concentration for the reactive liquid in order that the predetermined temperature may be maintained.

Certain terms used throughout the description and claims are understood to have the following meaning: reactive gas refers to the reagent which is gaseous under normal standard conditions or, being liquid under those conditions, exists in the gaseous phase when mixed with the inert gas as required for the operation of this process; concentrated acid or concentrated reactive liquid refers to strong but not necessarily anhydrous material, since the process is sufficiently flexible to operate within reasonable limits and still obtain a solid final product of good quality; and inert gas refers to any gas or mixture of gases which does not exert any appreciable chemical reactivity when brought in contact with any of the raw materials or with any of the intermediate or finished products.

I claim:

1. Process of making an ammonium salt of a mineral acid, which comprises, mixing gaseous ammonia and an inert gas in such proportions that the partial pressure of the ammonia in the gaseous mixture is greater than the vapor pressure of ammonia above the ammonium salt, and less than the vapor pressure of ammonia over the next compound in the series containing a larger proportion of the ammonia in combination where more than one compound may be made from the ammonia and the mineral acid, at the temperature of the reaction zone, with the amount of the ammonia in the gaseous mixture being at least that required to form the ammonium salt, and contacting the gaseous mixture continuously and countercurrently with a spray of the mineral acid, with the time of contact of the reactants being sufficient to result in a substantial equilibrium between the reactants at the elevation of the point of admission of the gaseous mixture.

2. Process of making di-ammonium phosphate, which comprises, mixing gaseous ammonia and an inert gas in such proportions that the partial pressure of the ammonia in the gaseous mixture is greater than the vapor pressure of ammonia above di-ammonium phosphate and less than the vapor pressure of ammonia above tri-ammonium phosphate at the temperature of the reaction zone, with the amount of the ammonia in the gaseous mixture being at least that required to form the di-ammonium phosphate, and contacting the gaseous mixture continuously and countercurrently with a spray of phosphoric acid, with the time of contact of the reactants being sufficient to result in a substantial equilibrium between the reactants at the elevation of the point of admission of the gaseous mixture.

3. Process of making mono-ammonium phosphate which comprises mixing gaseous ammonia and an inert gas in such proportions that the partial pressure of the ammonia in the gaseous mixture is greater than the vapor pressure of ammonia above mono-ammonium phosphate and less than the vapor pressure of ammonia above di-ammonium phosphate at the temperature of the reaction zone, with the amount of the ammonia in the gaseous mixture being at least that required to form the mono-ammonium phosphate, and contacting the gaseous mixture continuously and countercurrently with a spray of phosphoric acid, with the time of contact of the reactants being sufficient to result in a substantial equilibrium between the reactants at the elevation of the point of admission of the gaseous mixture.

4. Process of making mono-ammonium sulfate, which comprises, mixing gaseous ammonia and an inert gas in such proportions that the partial pressure of the ammonia in the gaseous mixture is greater than the vapor pressure of ammonia above mono-ammonium sulfate and less than the vapor pressure of ammonia above di-ammonium sulfate at the temperature of the reaction zone, with the amount of the ammonia in the gaseous mixture being at least that required to form the mono-ammonium sulfate, and contacting the gaseous mixture continuously and countercurrently with a spray of sulfuric acid, with the time of contact of the reactants being sufficient to result in a substantial equilibrium between the reactants at the elevation of the point of admission of the gaseous mixture.

HARRY A. CURTIS.